United States Patent [19]
Strange et al.

[11] Patent Number: 5,690,007
[45] Date of Patent: Nov. 25, 1997

[54] CUTTING APPARATUS FOR OBTAINING A SPECIMEN OF A FOOD PRODUCT CONTAINER

[75] Inventors: Robert A. Strange, Andover; Debra A. Crea, Stillwater; Joseph G. Anton, Brooklyn Park, all of Minn.

[73] Assignee: The Pillsbury Company, Minneapolis, Minn.

[21] Appl. No.: 615,169

[22] Filed: Mar. 12, 1996

[51] Int. Cl.[6] ................................... B23B 5/14
[52] U.S. Cl. .................... 82/70.1; 82/101; 82/169
[58] Field of Search ........................... 82/56–58, 77, 82/78, 98, 99.1, 101, 169, 70.1

[56] References Cited

U.S. PATENT DOCUMENTS

| 163,217 | 5/1875 | Lawson . | |
|---|---|---|---|
| 2,226,078 | 12/1940 | Spahn | 10/107 |
| 2,365,980 | 12/1944 | Thomas | 82/169 |
| 2,508,696 | 5/1950 | Thompson | 49/52 |
| 3,834,257 | 9/1974 | Ganser | 82/44 |
| 3,911,768 | 10/1975 | Kawano | 82/101 |
| 4,146,959 | 4/1979 | Hopper | 30/95 |
| 4,269,091 | 5/1981 | Hodapp et al. | 82/48 |
| 4,302,958 | 12/1981 | Andriessen et al. | 72/71 |
| 4,318,319 | 3/1982 | Schoun | 82/98 |
| 4,347,770 | 9/1982 | Mosey et al. | 82/90 |
| 4,450,738 | 5/1984 | Tupper et al. | 82/82 |
| 4,649,780 | 3/1987 | Takeuchi et al. | 82/98 |
| 4,693,149 | 9/1987 | Sireix | 82/53.1 |
| 5,170,684 | 12/1992 | Lofstrom | 82/70.1 |
| 5,383,380 | 1/1995 | Sartori | 82/70.1 |
| 5,423,238 | 6/1995 | Bory | 83/36 |

*Primary Examiner*—Daniel W. Howell
*Attorney, Agent, or Firm*—Westman, Champlin & Kelly, P.A.

[57] ABSTRACT

A cutting apparatus includes a mandrel insertable in a food product container. The mandrel supports the container in a fixed position by contacting an inner surface of the container. The mandrel is locatable on a support apparatus so that as the mandrel and container are rotated on the support apparatus, the container remains in a fixed axial position. Spaced-apart cutting knives contact an outer surface of the container to cut the sample therefrom while the mandrel and container are rotated.

21 Claims, 5 Drawing Sheets

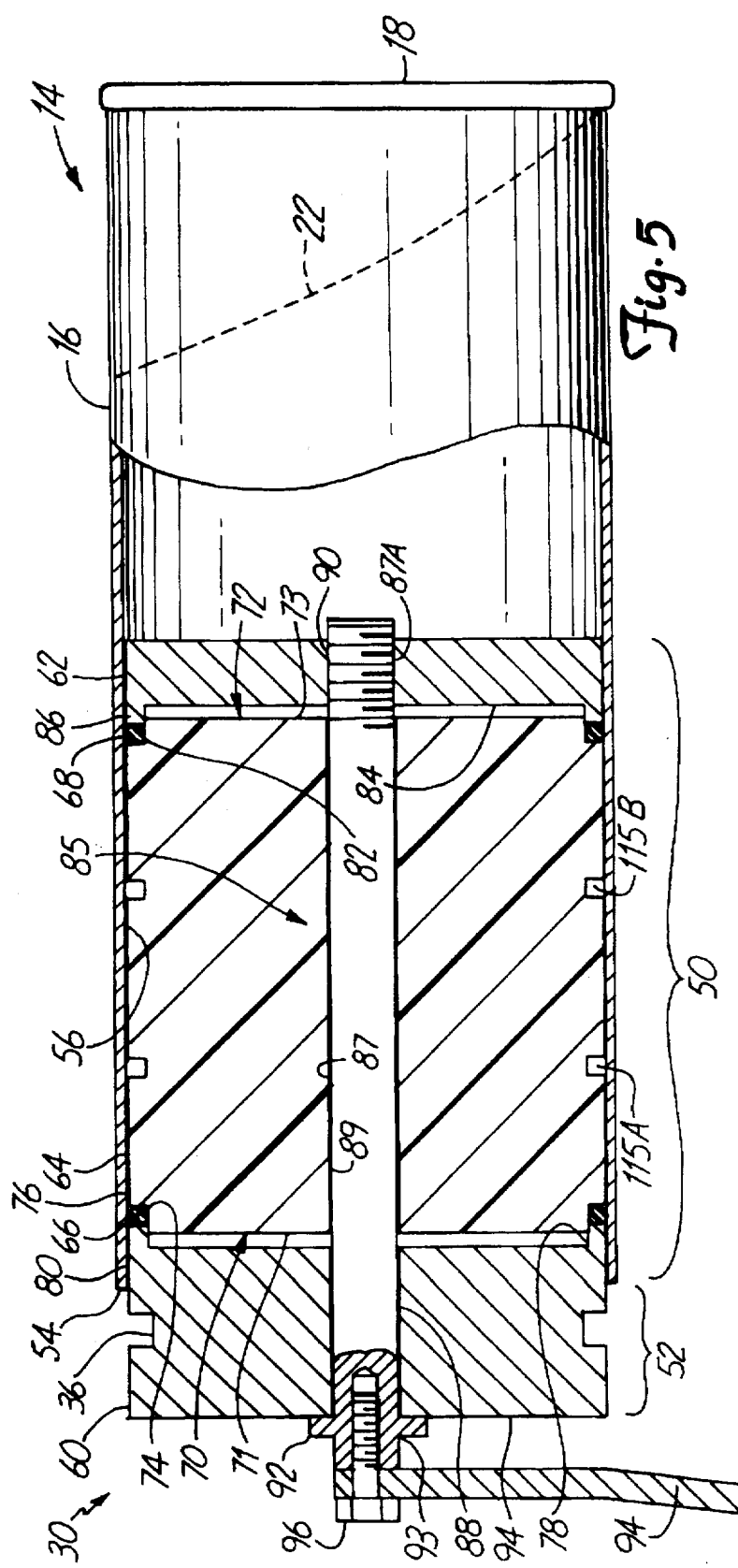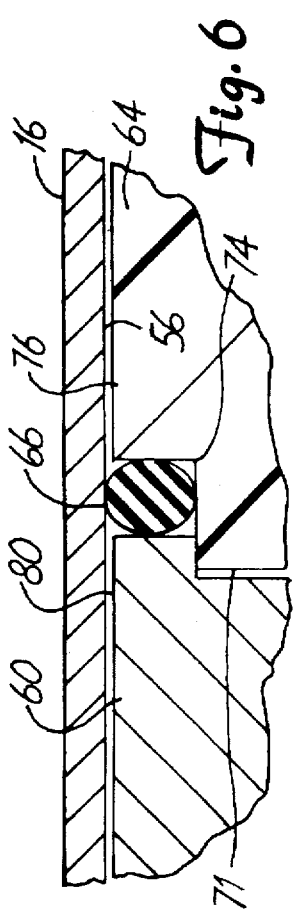

CUTTING APPARATUS FOR OBTAINING A SPECIMEN OF A FOOD PRODUCT CONTAINER

BACKGROUND OF THE INVENTION

The present invention relates generally to cutting apparatuses and, more particularly, to a cutting apparatus for obtaining a precise specimen of a food product container.

Food products are commonly packaged in containers that can be easily opened by the end user. One type of container commonly used for dough products is a spiral-wound composite container formed generally in a tube and having end caps at either end to enclose the dough product therein.

In the food packaging industry, it is desirable to test the containers to insure the containers are suitable for placing and storing the food products therein. One common prior art technique for testing spiral-wound composite containers includes obtaining a specimen of the main body of the container. The specimen is a short tube obtained by cutting an empty container with a suitable knife or saw. A first cut is made by starting on an outer surface of the main body and essentially cutting off one end of the container. A second cut is then made similar to the first cut. The second cut is axially displaced from the first cut to obtain the short tubular specimen of the main body.

Cutting the container in the manner discussed has disadvantages. First, the specimen can be damaged when the first and second cuts are made. In particular, the walls of the specimen can be weakened due to stresses introduced when the first and second cuts are made, thereby negatively affecting test results in an irregular and unpredictable way. In addition, the prior art technique of cutting does not insure that end surfaces of the specimen lie in a plane substantially perpendicular to an axis of the specimen, which is desirable during testing.

SUMMARY OF THE INVENTION

A cutting apparatus includes a mandrel insertable in a food product container. The mandrel supports the container in a fixed position by contacting an inner surface of the container. The mandrel is locatable on a support apparatus so that as the mandrel and container are rotated on the support apparatus, the container remains in a fixed axial position. Spaced-apart cutting knives contact an outer surface of the container to cut a specimen therefrom while the mandrel and container are rotated.

In a preferred embodiment for use with tubular food product containers, the mandrel includes a first cylindrical portion that is insertable in the food product container. The first cylindrical portion has an outer surface adapted to engage an inner surface of the food product container. A second cylindrical portion remains outside of the food product container. The second cylindrical portion has an annular groove. The annular groove is adapted to receive a second guide member formed on the support apparatus. Preferably, the support apparatus includes a first end support, a second end support and a trough extending between the first end support and the second end support. The trough supports the mandrel and the container for rotation thereon. A portion of the first end support forms the second guide member and is insertable in the annular groove to maintain an axial position of the mandrel during rotation.

BRIEF DESCRIPTION OF THE DRAWINGS

FIG. 5 is a sectional view of a mandrel inserted in a cylindrical food product container.

FIG. 6 is an enlarged view of FIG. 5.

DETAILED DESCRIPTION OF THE PREFERRED EMBODIMENTS

Figure 1:
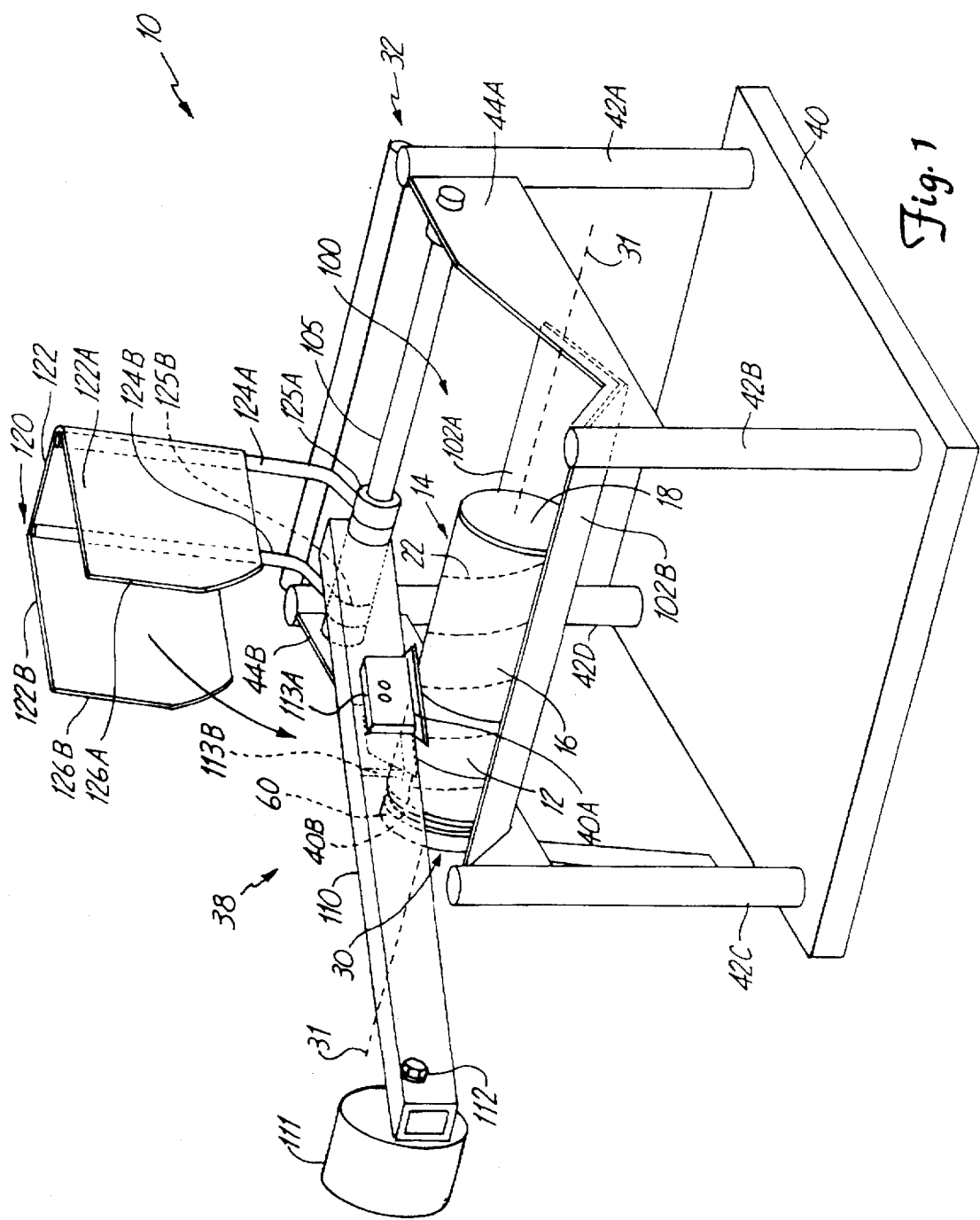
FIG. 1 is a perspective view of a cutting apparatus of the present invention.

FIG. 1 is a perspective illustration of an embodiment of a cutting apparatus 10 of the present invention. The cutting apparatus 10 is used to obtain a precise sample or specimen 12 from a food product container 14. In the embodiment illustrated, the food product container 14 is tubular having a main body portion 16 and end caps, one of which is illustrated at 18. The end caps retain a food product within the container 14. The main body portion 16 is formed from a helical band 20 having a helical or spiral opening edge 22 extending between the end caps 18. The cutting apparatus 10 cuts the main body 16 of the container 14 to obtain the specimen 12, which includes at least one segment of the opening edge 22. The specimen 12 is tested in order to determine characteristics of the main body portion 16, such as material stress tolerance and adhesion strength of the composite container layers. The specimen 12 prepared by the apparatus of the present invention can be tested using a wide variety of methods which do not form part of the invention.

Figure 2:
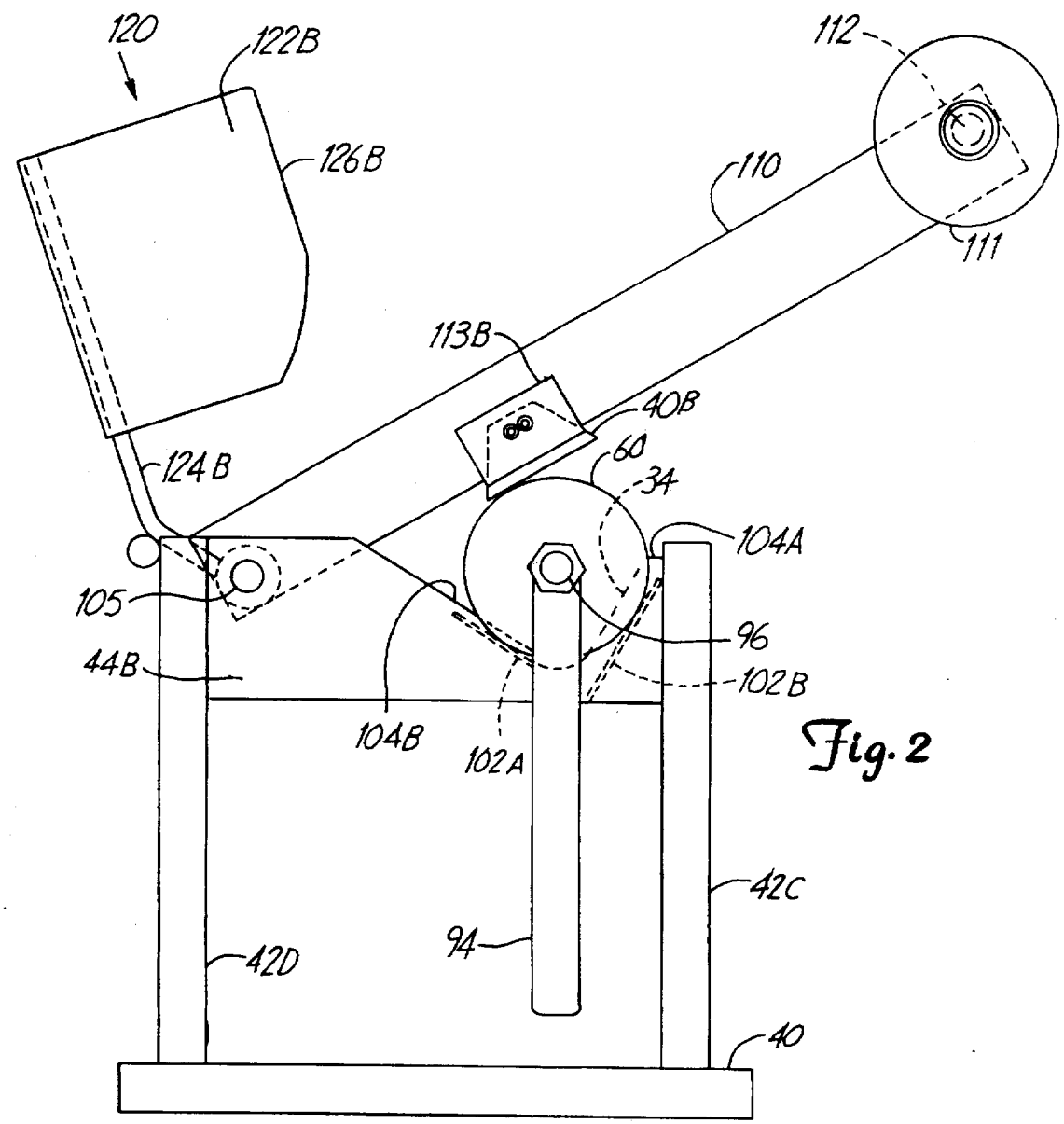
FIG. 2 is a side elevational view of the cutting apparatus.
Figure 3:
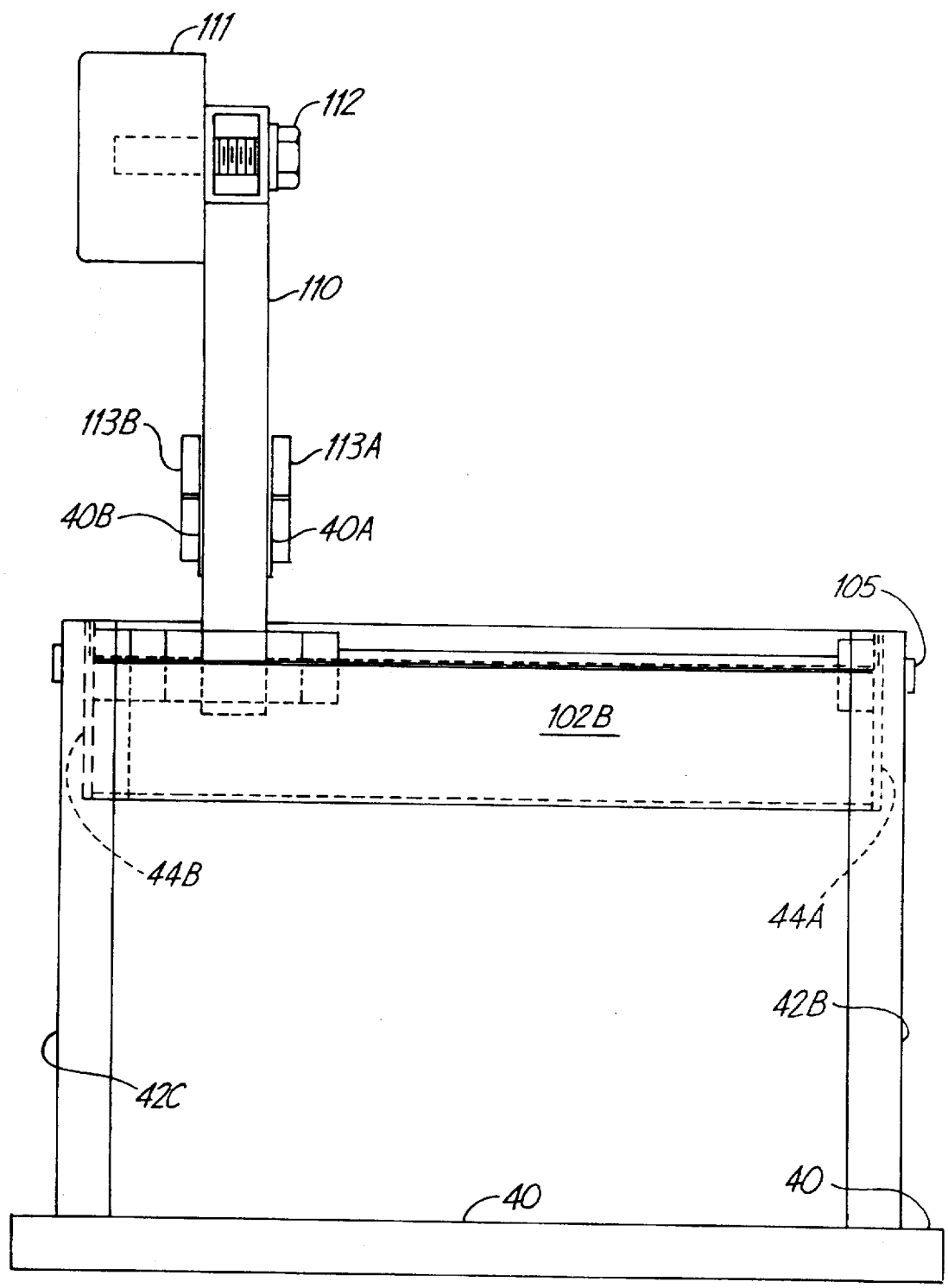
FIG. 3 is a front elevational view of the cutting apparatus with portions removed.
Figure 4:
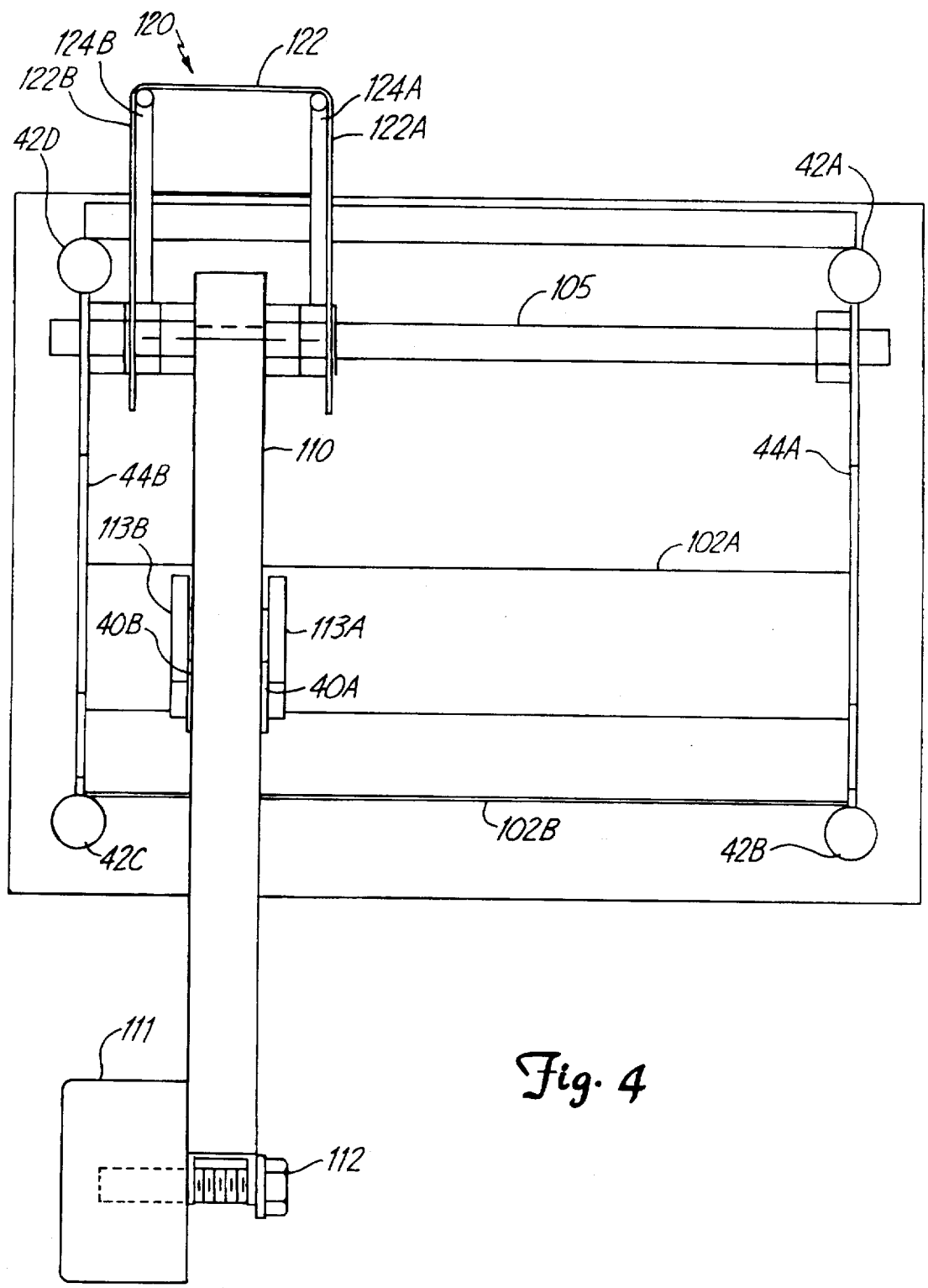
FIG. 4 is a top plan view of the cutting apparatus.

The cutting apparatus 10 includes a mandrel 30. Referring also to FIG. 5, the mandrel 30 is inserted in the container 14 and supports the container 14 from the inside during cutting. A support apparatus 32 supports the mandrel 30 and the container 14 for rotation thereon about an axis 31. The support apparatus 32 and mandrel 30 are coupled in a manner to retain the mandrel 30 in a desired axial position on the support apparatus 32 during rotation. In the embodiment illustrated, the support apparatus 32 includes a guide member 34 (FIG. 2) insertable in an annular groove 36 of the mandrel 30 to maintain the axial position of the mandrel 30 during rotation on the support apparatus 32. A knife assembly 38 is pivotally joined to the support apparatus 32. The knife assembly 38 includes spaced-apart cutting knives 40A and 40B that engage an outer surface of the main body portion 16 to cut and obtain the specimen 12 therefrom.

In the embodiment shown in FIG. 1, the support apparatus 32 includes a base 40. Support members 42A, 42B, 42C and 42D extend upwardly from the base 40. A first side panel 44A extends between support members 42A and 42B and is securely joined thereto. Similarly, a second side panel 44B extends between the support members 42C and 42D and is securely joined thereto. The guide member 34 is formed from a portion of the side panel 44B.

The diameter of the mandrel 30 should be selected to be somewhat less than the inner diameter of the container 140 preferably sufficient to facilitate easily mounting and removing the container 14 from the mandrel 30, but of a sufficient diameter to provide support for the main body 16 as it is being cut. The mandrel 30 has been inserted into the container 14 in FIG. 5. Generally, the mandrel 30 includes a first portion indicated at 50 that is inserted within the container 14 and a second portion 52 that remains outside of an open end 54 of the container 14. In the embodiment illustrated, the first portion 50 and the second portion 52 are cylindrical, which corresponds to an inner cylindrical surface 56 of the container 14.

The mandrel 30 includes a cylindrical member 60, a fastening nut 62 and a cylindrical spacer 64. A first flexible sealing ring or O-ring 66 is interposed between the cylindrical member 60 and the spacer 64. A second O-ring 68 is interposed between the spacer 64 and the fastening nut 62. The spacer 64 has a first end 70 facing the cylindrical member 60 and a second end 72 facing the fastening nut 62. Referring also to FIG. 6, an annular recess 74 is formed on the end 70 and opens to an end surface 71 and an outer cylindrical surface 76. The O-ring 66 is disposed in the annular recess 74. The spacer 64 can move relative to the cylindrical member 60. The cylindrical member 60 includes a recess 78, preferably cylindrical, having a diameter sufficient to receive the end 70. An outer annular flange 80 bounds the recess 78 and has a suitable cross-sectional width to be received by the annular recess 74 of the spacer 64. The annular flange 80 engages the O-ring 66.

The end 72 of the spacer 64 and the fastening nut 62 are constructed in a manner similar to the end 70 described above. An annular recess 82 is formed on the end 72 and opens to an end surface 73 of the end 72 and the outer surface 76 of the spacer 64. The fastening nut 62 preferably includes a cylindrical recess 84 that accepts or receives the end 72. The cylindrical recess 84 is bounded by an annular flange 86 having a cross-sectional width suitable to be received by the annular recess 82 in order to engage the O-ring 68.

An actuator 85 coupled to the cylindrical member 60 and the fastening nut 62 displaces the cylindrical member 60 and the fastener 62 toward each other and, thus, towards ends 70 and 72, respectively, in order to engage and compress the O-rings 66 and 68. In the embodiment illustrated, the actuator 86 comprises a bolt 87 that extends through suitable apertures 88 and 89 formed in the cylindrical member 60 and the spacer 64, respectively. The bolt 87 includes a threaded end 87A that threadably mates with a suitable threaded aperture 90 provided in the fastener 62.

An extending annular flange 92 is on an end 93 of the bolt 87 and contacts the cylindrical member 60 on an end surface 94. The annular flange 92 forms a stop that limits axial movement of the cylindrical member 60 on the bolt 87. In this manner, as the bolt 87 is rotated with respect to the fastening nut 62, the spacer 64 and the fastening nut 62 are drawn towards the cylindrical member 60 to compress the O-rings 66 and 68 against the inner wall surface of container 14, thereby fixedly securing the mandrel 30 inside the container 14. The diameter of mandrel 30 is preferably selected to minimize the distance between the O-rings 66 and 68 and the inner wall surface of container 14, while permitting easy mounting and removal of the container when the O-rings 66 and 68 are not engaged. Preferably, a handle or arm 94 is joined to the bolt 87 on the end 93 to provide a lever in aiding rotation of the bolt 87. A fastener 96 secures the handle 94 to the bolt 87.

It should be understood that the O-rings 66 and 68 are but one suitable type of compressible elements disposed between the cylindrical member 60, spacer 64 and nut 62, that can selectively expand to engage the inner surface 56. Likewise, other suitable actuating devices can be used to move the cylindrical member 60 and the nut 62 toward the spacer 64 to compress the O-rings 66 and 68. If desired, annular flanges can be formed on either or both ends of the spacer 64 instead of the cylindrical member 60 and nut 62. These annular flanges would then cooperate with annular recesses formed in the cylindrical member 60 and nut 62.

The support apparatus 32 supports the mandrel 30 for rotation thereon and cutting by the knife assembly 38.

Referring back to FIG. 1, the support apparatus 32 includes a trough 100 that is secured to and extends between the side panels 44A and 44B. In the embodiment illustrated, the trough 100 is formed from plates 102A and 102B, which converge and form a V-shaped trough. Although a semi-cylindrical trough having a diameter slightly greater than the outside diameter of the container 14 can be used, a trough 100 of the type having support surfaces that converge and are not of a single radius from the axis 31 is preferable because the trough 100 can be used to support many containers of different sizes.

As stated above, the guide member 34 is insertable in the annular groove 36 of the mandrel 30 to maintain an axial position of the mandrel 30 during rotation of the mandrel 30 and the container 14 on the support apparatus 32. In the embodiment illustrated, the guide member 34 comprises portions of edges 104A and 104B of the side panel 44B. Like the plates 102A and 102B of the trough 100, the edges 104A and 104B converge so that mandrels of different size can be properly guided during rotation. It should be understood that the handle 94 is used to rotate the mandrel 30 and thus the container 14. Other mechanisms for rotating the mandrel 30 and container 14 can be used, such as a belt or chain driven assembly, or a rotational servo-driven assembly.

The knife assembly 38 is pivotally joined to the support apparatus 32. In the embodiment illustrated, a pivot rod 105 extends between the side panels 44A and 44B. The knife assembly 38 includes an arm 110 suitably joined to the rod 105 to allow rotation thereabout. The spaced-apart cutting knives 40A and 40B are secured to oppose side surfaces of the arm 110 with clamping blocks 113A and 113B. At a distal end of the arm 110, a suitable mass 111 is secured with a fastener such as a bolt 112. The weight of the mass 111 provides a downward force so that the knives 40A and 40B engage the container 14 to promote uniform cutting. Alternatively, any other force causing the knives 40A and 40B to engage the container 14 can be used, for example a spring. Referring back to FIG. 5, annular grooves 115A and 115B can be formed in the spacer 64 to receive the knives 44A and 44B, respectively, if desired.

A guard assembly 120 is selectively positioned proximate the spaced-apart cutting knives 40A and 40B. The guard assembly 120 includes a shield 122 having spaced-apart side plates 122A and 122B. Support arms 124A and 124B are joined to the shield 122 and pivot on the rod 105 at ends 125A and 125B, respectively. The guard assembly 120 pivots downwardly to cover the cutting knives 40A and 40B. Edges 126A and 126B of the side plates 122A and 122B, respectively, ride upon the outer surface of the main body 16 during cutting. If desired, more than one knife and guard assembly can be attached to support apparatus 32 to obtain specimens from different positions along the length of the container 14.

In summary, the cutting apparatus 10 of the present invention provides a convenient and repeatable system to obtain consistent specimens of food product containers. The mandrel 30 is easily inserted within the container 14 and supports the container 14 in a fixed position by contacting the inner surface 56. The mandrel 30 is locatable on the support apparatus 32 so that as the mandrel 30 and container 14 are rotated, the container 14 remains in a fixed axial position. The cutting knives 40A and 40B uniformly cut the container 14 to obtain the specimen 12 with reduced stress or damage to the specimen 12 so that the specimen more accurately represents the main body 16.

Although the present invention has been described with reference to preferred embodiments, workers skilled in the art will recognize that changes may be made in form and detail without departing from the spirit and scope of the invention.

What is claimed is:

1. A cutting apparatus for cutting a specimen of a selected dimension from a food product container, the cutting apparatus comprising:
   a mandrel comprising:
      a first portion insertable in the food product container having an outer surface adapted to engage an inner surface of the food product container so that rotation of the mandrel causes rotation of the food product container; and
      a second portion having a first guide member;
   a support base for supporting the mandrel for rotation thereon, the support base having a second guide member operable with the first guide member to maintain an axial position of the mandrel during rotation; and
   a knife assembly movably joined to the support base, the knife assembly having spaced-apart cutting knives engageable with an outer surface of the food product container for obtaining the specimen.

2. The cutting apparatus of claim 1 wherein the first portion of the mandrel includes axially spaced-apart compressible members and an actuator to compress the compressible members and engage the inner surface.

3. The cutting apparatus of claim 2 wherein each compressible member comprises an O-ring.

4. The cutting apparatus of claim 2 wherein the first portion includes a cylindrical member disposed between the compressible members and the actuator comprises a rod extending through the second portion, the cylindrical member, and the compressible members.

5. The cutting apparatus of claim 4 wherein the first portion includes a nut and the rod includes a bolt threadably engaging the nut.

6. The cutting apparatus of claim 1 wherein the first guide member comprises an annular groove and wherein the second guide member is insertable in the annular groove.

7. The cutting apparatus of claim 1 wherein the support base includes a first end support, a second end support and a trough extending between the first end support and the second end support for supporting the mandrel.

8. The cutting apparatus of claim 7 wherein the first guide member comprises an annular groove and wherein the second guide member comprises a portion of the first end support, the portion being insertable in the annular groove.

9. The cutting apparatus of claim 7 wherein the trough includes converging side walls.

10. The cutting apparatus of claim 9 wherein the side walls are planar.

11. The cutting apparatus of claim 1 wherein the knife assembly is pivotally joined to the support base.

12. The cutting apparatus of claim 1 wherein the knife assembly includes a guard having plates facing each of the spaced-apart knives.

13. A cutting apparatus for cutting a specimen of a selected dimension from a tubular food product container, the cutting apparatus comprising:
   a mandrel comprising:
      a first cylindrical portion insertable in the food product container having an outer surface adapted to engage an inner surface of the food product container so that rotation of the mandrel causes rotation of the food product container; and
      a second cylindrical portion having a first guide member;
   a support base for supporting the mandrel for rotation thereon, the support base having a first end support, a second end support and a trough extending between the first end support and the second end support for supporting the mandrel, and a second guide member operable with the first guide member to maintain an axial position of the mandrel during rotation; and
   a knife assembly movably joined to the support base, the knife assembly having spaced-apart cutting knives engageable with an outer surface of the food product container for obtaining the specimen.

14. The cutting apparatus of claim 13 wherein the first guide member comprises an annular groove and wherein the second guide member comprises a portion of the first end support, the portion being insertable in the annular groove.

15. The cutting apparatus of claim 14 wherein the first portion of the mandrel includes axially spaced-apart compressible members and an actuator to compress the compressible members and engage the inner surface.

16. The cutting apparatus of claim 15 wherein the first portion includes a cylindrical member disposed between the compressible members and the actuator comprises a rod extending through the second portion, the cylindrical member, and the compressible members.

17. The cutting apparatus of claim 16 wherein each compressible member comprises an 0-ring.

18. The cutting apparatus of claim 17 wherein the first portion includes a nut and the rod includes a bolt threadably engaging the nut.

19. The cutting apparatus of claim 1 wherein the mandrel is removable from the support base, and wherein the second guide member of the support base is detachably coupleable with the first guide member of the second portion of the mandrel.

20. A cutting apparatus for cutting a specimen of a selected dimension from a food product container, the cutting apparatus comprising:
   a mandrel comprising:
      a first portion insertable in the food product container having an outer surface adapted to engage an inner surface of the food product container so that rotation of the mandrel causes rotation of the food product container; and
      a second portion having a first guide member;
   support means for removably supporting the mandrel for rotation thereon, the support means having a first surface and a second surface, wherein the first and second surfaces are substantially convergent, the support means having a second guide member detachably coupleable with the first guide member to maintain an axial position of the mandrel during rotation; and
   a knife assembly movably joined to the support base, the knife assembly having spaced-apart cutting knives engageable with an outer surface of the food product container for obtaining the specimen.

21. The cutting apparatus of claim 20, wherein the support means comprises a trough.

* * * * *